US010288119B2

(12) United States Patent
Nelson et al.

(10) Patent No.: US 10,288,119 B2
(45) Date of Patent: May 14, 2019

(54) ORIFICE PLATE BEARING LUBRICATION SYSTEM

(71) Applicant: GE Oil & Gas ESP, Inc., Oklahoma City, OK (US)

(72) Inventors: Andrew Michael Nelson, Oklahoma City, OK (US); Michael David Campbell, Oklahoma City, OK (US); Jonathan Edward Peterson, Oklahoma City, OK (US)

(73) Assignee: GE Oil & Gas ESP, Inc., Oklahoma City, OK (US)

( * ) Notice: Subject to any disclaimer, the term of this patent is extended or adjusted under 35 U.S.C. 154(b) by 101 days.

(21) Appl. No.: 15/516,415

(22) PCT Filed: Oct. 1, 2014

(86) PCT No.: PCT/US2014/058655
§ 371 (c)(1),
(2) Date: Apr. 3, 2017

(87) PCT Pub. No.: WO2016/053332
PCT Pub. Date: Apr. 7, 2016

(65) Prior Publication Data
US 2018/0231058 A1 Aug. 16, 2018

(51) Int. Cl.
*F16C 33/66* (2006.01)
*F04D 13/06* (2006.01)
(Continued)

(52) U.S. Cl.
CPC .......... *F16C 33/6659* (2013.01); *F04D 13/06* (2013.01); *F04D 29/0413* (2013.01);
(Continued)

(58) Field of Classification Search
CPC .............. F16C 33/6659; F16C 2360/44; F04D 29/0413; F04D 29/0513; F04D 29/059
See application file for complete search history.

(56) References Cited

U.S. PATENT DOCUMENTS 4,915,510 A * 4/1990 Arvidsson ............... F16C 23/02
384/121
6,357,921 B1 3/2002 Dittenhofer
(Continued)

FOREIGN PATENT DOCUMENTS

JP 2002-242881 A 8/2002
RU 2 246 638 C2 2/2005
(Continued)

OTHER PUBLICATIONS

International Search Report and Written Opinion issued in connection with corresponding PCT Application No. PCT/US2014/058655 dated Jun. 29, 2015.
(Continued)

*Primary Examiner* — Thomas R Hannon
(74) *Attorney, Agent, or Firm* — GE Global Patent Operation

(57) ABSTRACT

A thrust control assembly for use in a horizontal pumping system includes a thrust bearing chamber that is filled with a fluid lubricant, a thrust bearing assembly contained within the thrust bearing chamber, a first radial bearing chamber, a first radial bearing assembly contained within the first radial bearing chamber and a first metering assembly. The first metering assembly controls the flow of lubricant from the thrust bearing chamber to the first radial bearing chamber. The first metering assembly may include an orifice plate.

20 Claims, 6 Drawing Sheets

(51) Int. Cl.
  *F04D 29/041* (2006.01)
  *F04D 29/051* (2006.01)
  *F04D 29/059* (2006.01)
  *F04D 29/06* (2006.01)
  *F16C 19/10* (2006.01)
  *F04D 1/06* (2006.01)

(52) U.S. Cl.
  CPC ....... *F04D 29/059* (2013.01); *F04D 29/0513* (2013.01); *F04D 29/061* (2013.01); *F16C 19/10* (2013.01); *F04D 1/06* (2013.01); *F16C 2360/44* (2013.01)

(56) References Cited

U.S. PATENT DOCUMENTS

| | | | |
|---|---|---|---|
| 7,084,522 B2 * | 8/2006 | Wobben | F03D 1/065 290/44 |
| 7,396,164 B1 | 7/2008 | Schwartzman | |
| 7,982,455 B2 * | 7/2011 | Ito | G01P 3/443 324/174 |
| 8,246,251 B1 * | 8/2012 | Gardner | F04D 13/086 384/420 |
| 2006/0269178 A1 | 11/2006 | Mascola | |
| 2010/0089702 A1 | 4/2010 | Sasaki et al. | |

FOREIGN PATENT DOCUMENTS

| | | |
|---|---|---|
| WO | 93/011381 A1 | 6/1993 |
| WO | 02/04828 A1 | 1/2002 |

OTHER PUBLICATIONS

International Preliminary Report on Patentability issued in connection with corresponding PCT Application No. PCT/US2014/058655 dated Apr. 4, 2017.

Office Action issued in connection with related RU Application No. 2017111243 dated Jul. 9, 2018.

* cited by examiner

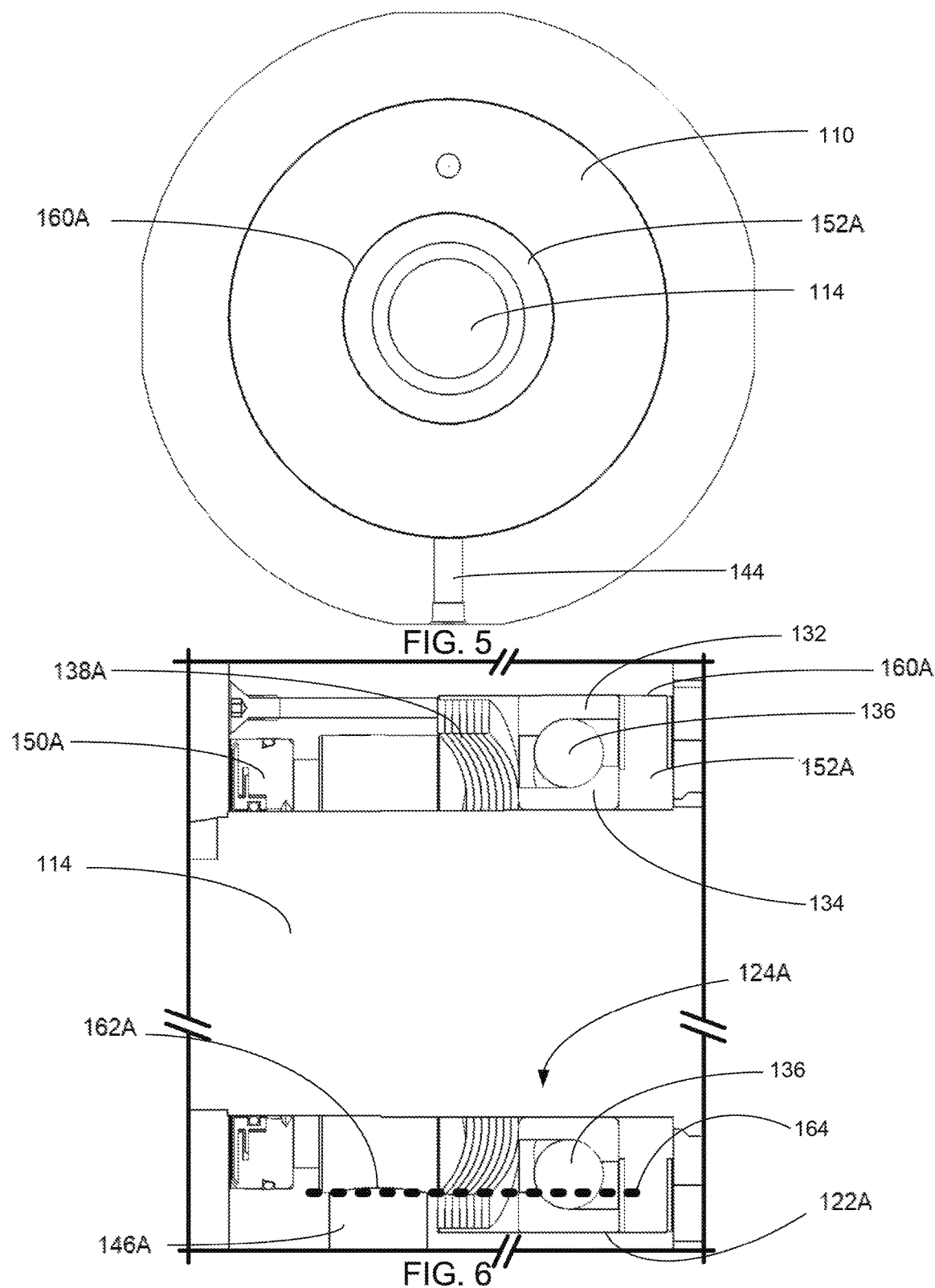

ORIFICE PLATE BEARING LUBRICATION SYSTEM

BACKGROUND

This invention relates generally to the field of pumping systems, and more particularly to a lubrication system for bearing components within a thrust chamber.

Horizontal pumping systems are used in various industries for a variety of purposes. For example, in the oil and gas industry horizontal pumping systems are used to pump fluids, such as water separated from oil, to a remote destination, such as a tank or disposal well. Typically these horizontal pumping systems include a pump, a motor, and a suction chamber positioned between the pump and the motor. A thrust chamber is also included between the motor and the suction chamber.

During operation, the pump exerts a thrust that is conveyed along the shaft to the thrust chamber. The thrust chamber opposes the thrust generated by the pump and limits the axial displacement of the shaft. The thrust chamber includes a thrust bearing assembly that may include as a set both a thrust runner connected to the rotating shaft and a stationary thrust pad. The rotating thrust runner presses against the thrust pad to unload the axial thrust generated by the pump. The thrust bearing assembly is typically a hydrodynamic bearing that operates by maintaining a layer of fluid lubricant between the thrust runner and the stationary thrust pad.

The thrust chamber may also include one or more ball bearing assemblies that are used to support the thrust chamber shaft. In the past, these ball bearing assemblies have been flooded with the same fluid lubricant used to maintain the hydrodynamic thrust bearing assembly. It has been determined, however, that the submersion of the ball bearing assemblies in a flooded condition may reduce the useful life of the ball bearings. There is, therefore, a need for a lubrication system within the thrust chamber that maintains the optimal lubricant level for both the hydrodynamic bearing assembly and the ball bearing assemblies. It is to these and other deficiencies in the prior art that the embodiments are directed.

SUMMARY

In some embodiments, the present invention includes a thrust control assembly for use in a horizontal pumping system. The thrust control assembly includes a thrust bearing chamber that is filled with a fluid lubricant, a thrust bearing assembly contained within the thrust bearing chamber, a first radial bearing chamber, a first radial bearing assembly contained within the first radial bearing chamber and a first metering assembly. The first metering assembly controls the flow of lubricant from the thrust bearing chamber to the first radial bearing chamber.

In another aspect, some embodiments include a horizontal pumping system that includes a motor, a pump driven by the motor and a thrust control assembly connected between the motor and the pump. The thrust control assembly includes a thrust bearing chamber that is filled with a fluid lubricant, a thrust bearing assembly contained within the thrust bearing chamber, a first radial bearing chamber and a first radial bearing assembly contained within the first radial bearing chamber. The thrust control assembly also includes a first metering assembly that controls the flow of lubricant from the thrust bearing chamber to the first radial bearing chamber.

In yet another aspect, the embodiments may include a lubricant circulation system for use in a thrust control assembly of a horizontal pumping system. The lubricant circulation system includes a thrust bearing chamber within the thrust control assembly that is filled with a fluid lubricant, a thrust bearing assembly within the thrust bearing chamber, a first radial bearing chamber within the thrust control assembly and a first radial bearing assembly within the first radial bearing chamber. The lubricant circulation system further includes a first metering assembly positioned between the thrust bearing chamber and the first radial bearing chamber. The first metering assembly controls the flow of fluid lubricant from the thrust bearing chamber to the first radial bearing chamber.

BRIEF DESCRIPTION OF THE DRAWINGS

FIG. 5 is a pump-side view of the first orifice plate within the thrust chamber of FIG. 2.

FIG. 6 is a cross-sectional close-up view of the first orifice plate and first ball bearing assembly.

DETAILED DESCRIPTION

Figure 1:
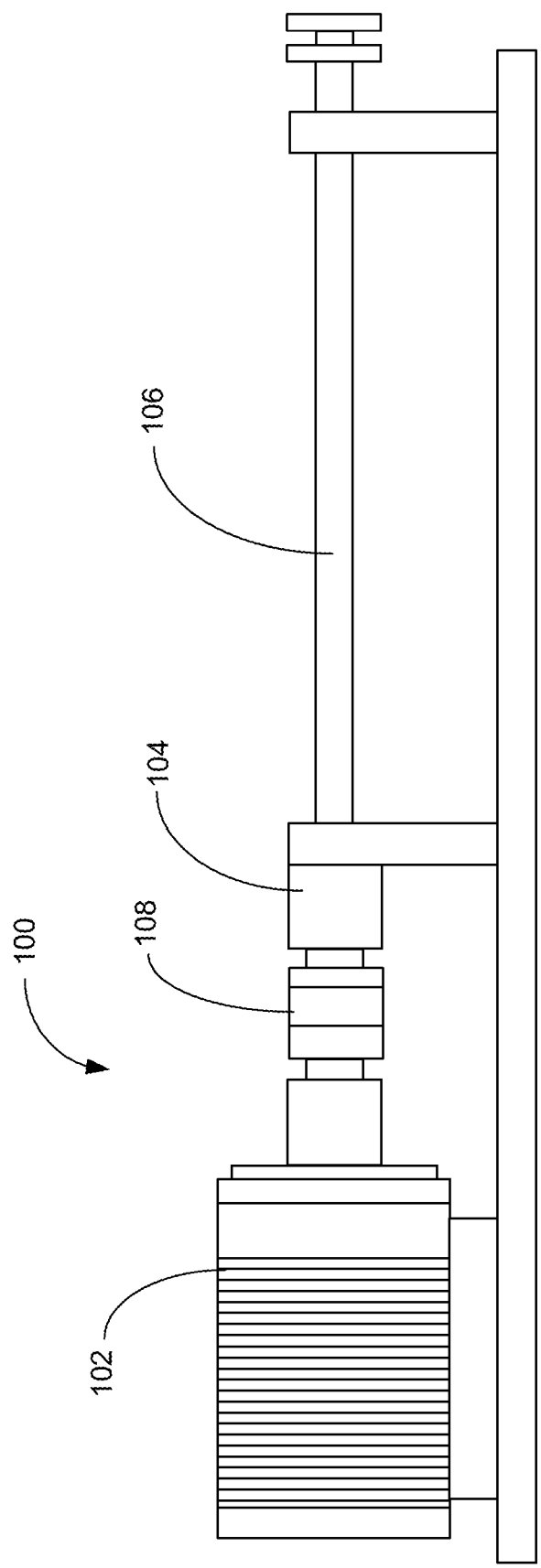
FIG. 1 is a side view of a horizontal pumping system constructed in accordance with a an embodiment.

In accordance with an embodiment, FIG. 1 shows a side view of a horizontal pumping system 100. The horizontal pumping system 100 includes a motor 102, a suction chamber 104, a pump 106 and a thrust control assembly 108. The suction chamber 104 is connected between the pump 106 and the thrust control assembly 108. The thrust control assembly 108 is connected between the suction chamber 104 and the motor 102. Generally, the motor 102 drives the pump 106 through a series of shafts (not visible in FIG. 1) that extend through the thrust control assembly 108 and suction chamber 104. Pumped fluids are provided to the suction chamber 104 and pressurized by the pump 106. In an embodiment, the pump 106 is a centrifugal pump. In an embodiment, the pump 106 is a multistage centrifugal pump.

Figure 2:
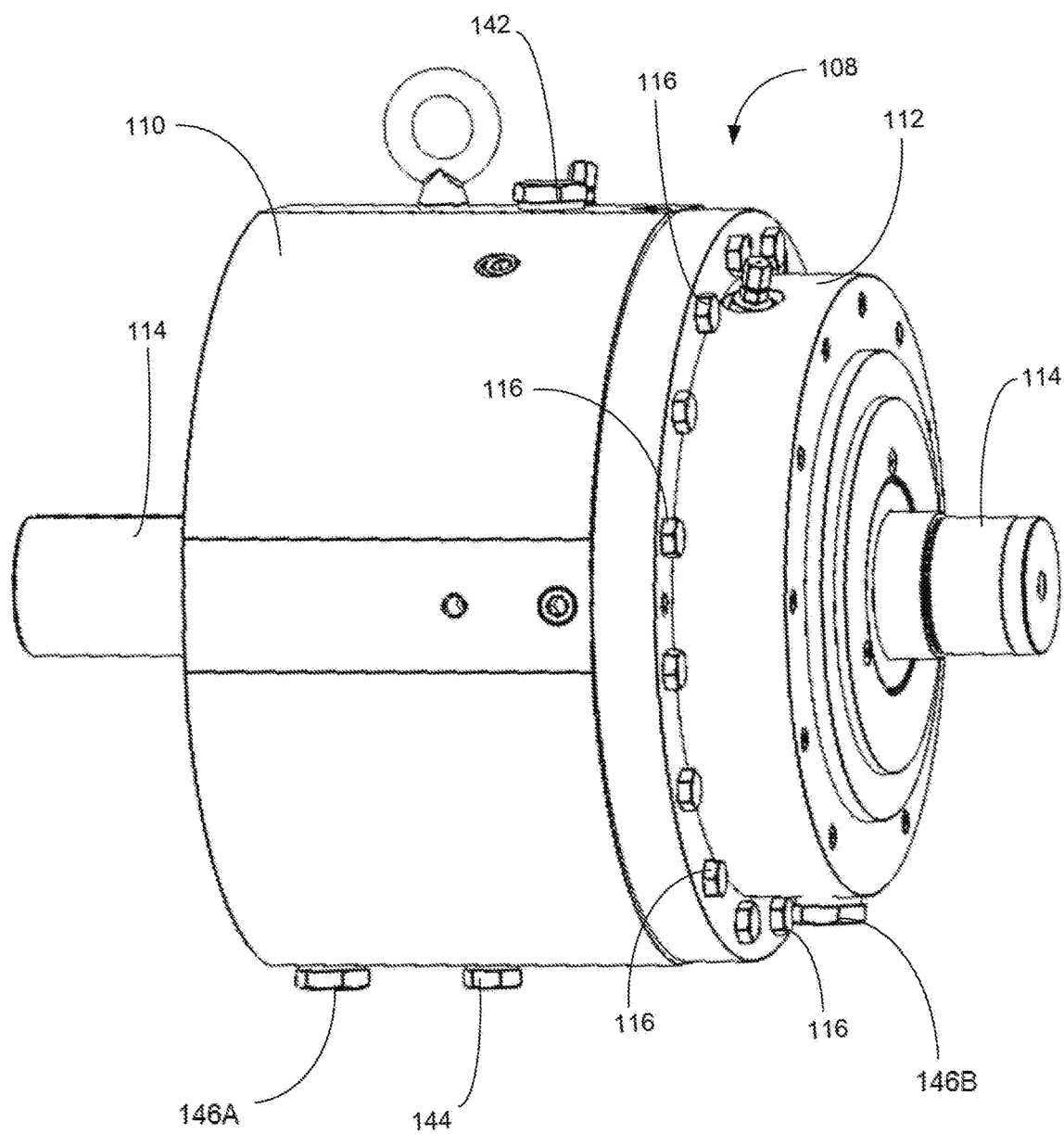
FIG. 2 is a perspective side view of the thrust chamber of the horizontal pumping system of FIG. 1.

Turning to FIG. 2, shown therein is a perspective view of the thrust control assembly 108 constructed in accordance with an embodiment. The thrust control assembly 108 includes a first housing 110, a second housing 112 and a thrust chamber shaft 114. The thrust chamber shaft 114 is configured to transfer torque from the motor 102 to a stub shaft (not shown) that extends into the suction chamber 104. The first housing 110 and second housing 112 are configured to be secured together with housing fasteners 116. The first and second housings 110, 112 cooperatively contain the internal components of the thrust control assembly 108.

Figure 3:
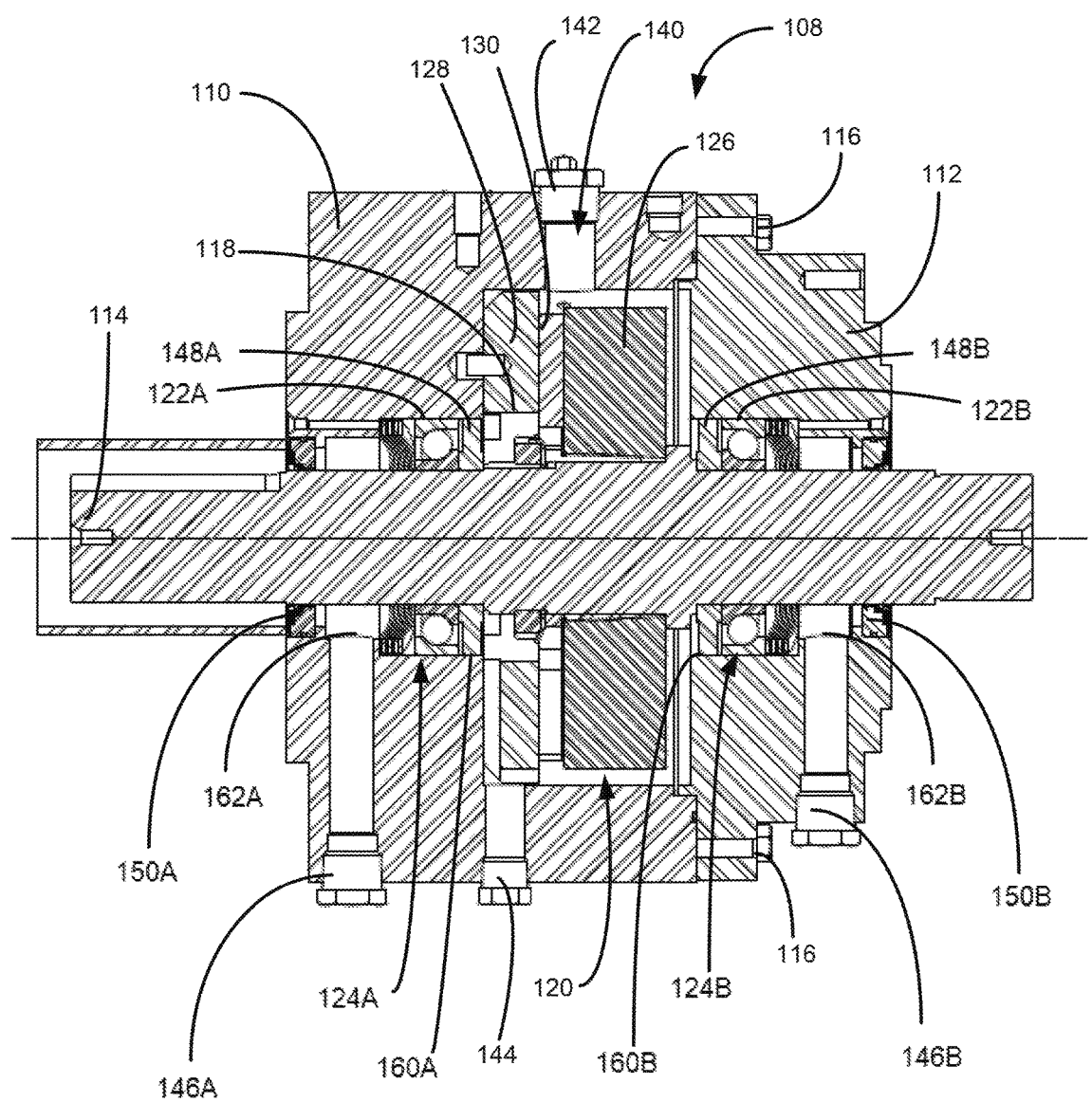
FIG. 3 is a cross-sectional side view of the thrust chamber of FIG. 2.

Turning to FIG. 3, shown therein is a cross-sectional view of the thrust control assembly 108. The thrust control assembly 108 includes an internal thrust bearing chamber 118 and a thrust bearing assembly 120 contained within the thrust bearing chamber 118. The thrust control assembly 108 also includes first and second internal radial bearing chambers 122A, 122B and first and second radial bearing assemblies 124A, 124B that are respectively contained within the first and second radial bearing chambers 122A, 122B. The radial bearings 124A, 124B may be positioned on opposite sides of the thrust bearing assembly 120 and provide radial support to limit lateral displacement of the thrust chamber shaft 114.

The thrust bearing assembly 120 may include a rotatable thrust runner 126 connected to the thrust chamber shaft 114 and a stationary thrust bearing 128 connected within the first housing 110. The stationary thrust bearing 128 may include a series of thrust pads 130 that are configured for contact with the thrust runner 126. When assembled, the thrust runner 126 is placed in close proximity with the thrust pads 130. In some embodiments, the thrust bearing assembly 120 is a hydrodynamic bearing that optimally includes a quantity of fluid between the thrust pads 130 and the thrust runner 126.

Figure 8:
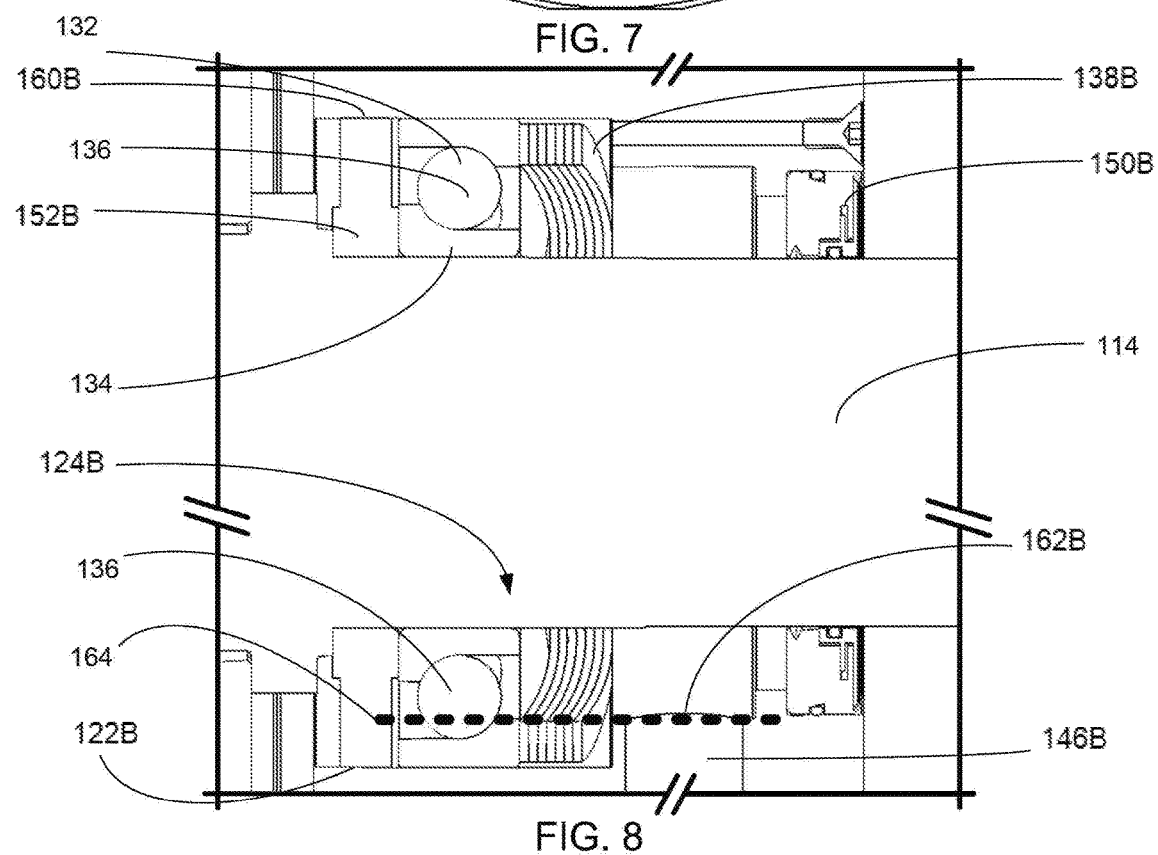
FIG. 8 is a cross-sectional close-up view of the second orifice plate and second ball bearing assembly.

As best illustrated in the close-up cross-sectional views in FIGS. 6 and 8, the first and second radial bearing assemblies 124A, 124B each include a stationary outer race 132 in contact with the interior wall of the respective radial bearing chambers 122A, 122B. The first and second radial bearing assemblies 124A, 124B also include a rotatable inner race 134 connected to the thrust chamber shaft 114 and a plurality of ball bearings 136 captured between the inner race 134 and outer race 132.

The first and second radial bearing assemblies 124A, 124B may each include springs 138A, 138B 138B, respectively, that apply a longitudinally-directed force against the radial bearing assemblies 124A, 124B. The springs 138A, 138B 138B maintain the longitudinal alignment of the inner race 134 and outer race 132 and provide for the accommodation of slight axial movement of the thrust chamber shaft 114.

Referring back to FIG. 3, the thrust control assembly 108 includes a lubricant circulation system 140 that includes a thrust bearing return port 142, a lubricant injection port 144, a first radial bearing assembly drain 146A, a second radial bearing assembly drain 146B, first and second metering assemblies 148A, 148B and first and second shaft seals 150a, 150b.

Generally, lubricant is pumped to the thrust control assembly 108 from an external pressurized source (not shown) and introduced into the thrust bearing chamber 118 through the lubricant injection port 144. Lubricant within the thrust bearing chamber 118 is evacuated through the thrust bearing return port 142 and also through the metering assemblies 148A, 148B into the first and second radial bearing chambers 122A, 122B. In some embodiments, it is desirable to maintain the thrust bearing assembly 120 in a flooded condition in which the thrust bearing chamber 118 is filled with fluid lubricant. Accordingly, the volumetric flow rate of lubricant leaving the thrust bearing chamber 118 may not exceed the volumetric flow rate of lubricant entering the thrust bearing chamber 118 during normal operating conditions.

Figure 4:
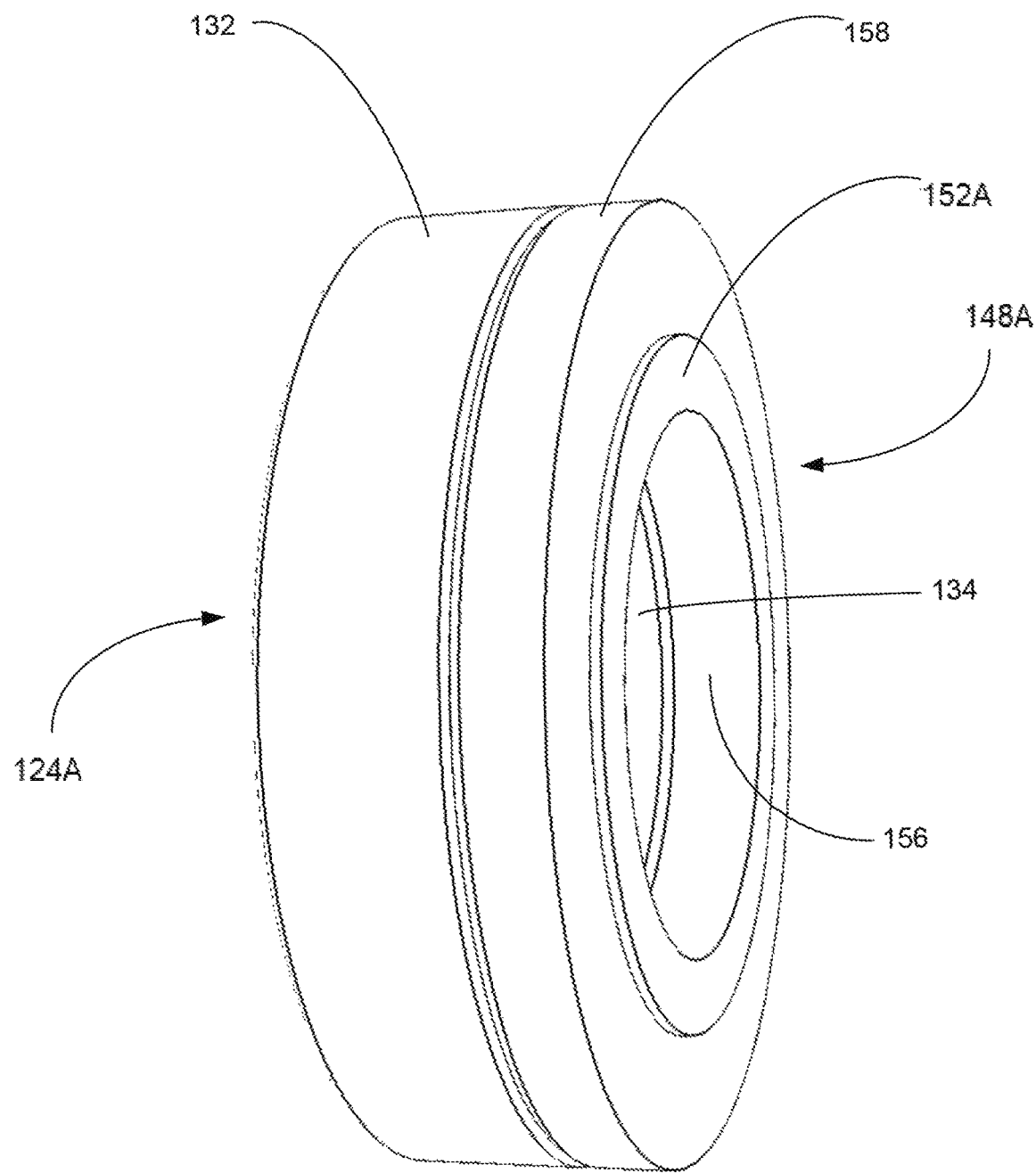
FIG. 4 is a perspective view of the orifice plate of the thrust chamber of FIG. 2.
Figure 7:
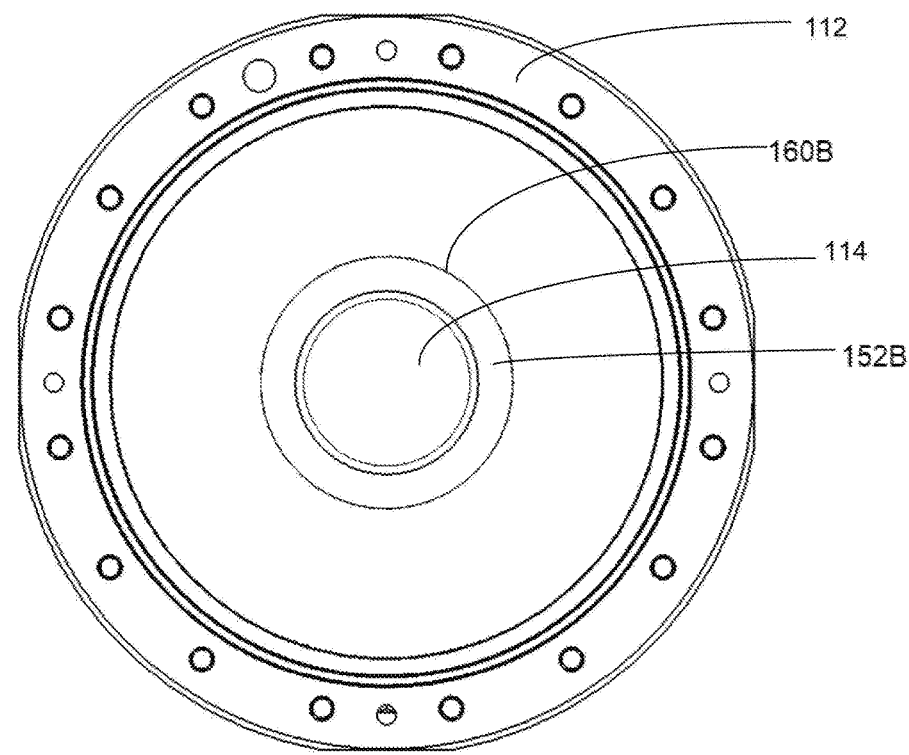
FIG. 7 is a motor-side view of the second orifice plate within the thrust chamber of FIG. 2.

The first and second metering assemblies 148A, 148B are used to control the volume of fluid lubricant entering the first and second radial bearing chambers 122A, 122B from the thrust bearing chamber 118. Turning to FIG. 4, shown therein is a perspective view of the first metering assembly 148A. In some embodiments, the first and second metering assemblies 148A, 148B include orifice plates 152A, 152B that are configured for connection to the thrust chamber shaft 114. Each orifice plate 152A, 152B includes an interior surface 156 that has a diameter nominally the same size as the outer diameter of the thrust chamber shaft 114. Each orifice plate 152A, 152B includes an exterior surface 158 that has a diameter that is a selected amount smaller than the interior diameter of the respective one of the first and second radial bearing chambers 122A, 122B.

In an embodiment, the first and second orifice plates 152A, 152B are identical in construction and dimension. In an alternate embodiment, the first and second orifice plates 152A, 152B are similarly constructed but have different dimensions. Although first and second orifice plates 152A, 152B may be included in some embodiments, it will be appreciated that other metering assemblies 148A, 148B may also be used to control the flow of lubricant into the radial bearing chambers 122A, 122B. Such alternative metering assemblies 148A, 148B include reservoir and weir systems.

Referring now to FIGS. 5-8, the difference between the diameters of the exterior surface 158 of the orifice plates 152A, 152B and the interior wall of the radial bearing chambers 122A, 122B creates an annulus 160A, 160B that permits lubricant to flow from the thrust bearing chamber 118 into the radial bearing chambers 122A, 122B. The volume of fluid moving into the radial bearing chambers 122A, 122B is dependent upon the cross-sectional area of the respective annulus 160A, 160B and the pressure differential across the metering assemblies 148A, 148B.

The level of lubricant in the radial bearing chambers 122A, 122B is controlled by the position of drain ports 162A, 162B for each of the first and second radial bearing assembly drains 146A, 146B. As illustrated in FIGS. 6 and 8, the lubricant fluid in the first and second radial bearing chambers 122A, 122B may be limited to a fluid level 164 that is horizontally aligned with the drain ports 162A, 162B. Any fluid above the fluid level 164 is removed through the first and second radial bearing assembly drains 146A, 146B and returned to external source of pressurized lubricant. In an embodiment, the fluid level 164 is set so that the lubricant covers less than one-half the lowermost ball bearing 136 in each of the first and second radial bearing assemblies 124A, 124B.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A thrust control assembly for use in a horizontal pumping system, the thrust control assembly comprising:
   a thrust bearing chamber, wherein the thrust bearing chamber is configured to contain a quantity of fluid lubricant;
   a thrust bearing assembly contained within the thrust bearing chamber; a first radial bearing chamber;
   a first radial bearing assembly contained within the first radial bearing chamber; and
   a first metering assembly, wherein the first metering assembly is configured to control the flow of lubricant from the thrust bearing chamber to the first radial bearing chamber.

2. The thrust control assembly of claim 1, wherein the thrust control assembly further comprises a thrust chamber shaft and wherein the first metering assembly comprises an orifice plate that is attached to the thrust chamber shaft.

3. The thrust control assembly of claim 2, wherein the orifice plate of the first metering assembly has an exterior surface and wherein the radial bearing chamber has an interior surface and wherein a diameter of the exterior surface of the orifice plate is less than a diameter of the interior surface of the radial bearing chamber.

4. The thrust control assembly of claim 1, further comprising:
   a second radial bearing chamber;
   a second radial bearing assembly contained within the second radial bearing chamber; and
   a second metering assembly, wherein the second metering assembly is configured to control the flow of lubricant from the thrust bearing chamber to the second radial bearing chamber.

5. The thrust control assembly of claim 4, wherein the second metering assembly comprises an orifice plate that is connected to the second radial bearing chamber.

6. The thrust control assembly of claim 4, wherein the thrust control assembly further comprises a thrust chamber shaft and wherein the second metering assembly comprises an orifice plate that is attached to the thrust chamber shaft.

7. The thrust control assembly of claim 4, further comprising a lubricant circulation system, wherein the lubricant circulation system comprises:
   a lubricant injection port connected to the thrust bearing chamber;
   a thrust bearing return port connected to the thrust bearing chamber;
   a first radial bearing assembly drain connected to the first radial bearing chamber, wherein the first radial bearing assembly drain includes a first drain port; and a second radial bearing assembly drain connected to the second radial bearing chamber, wherein the first second bearing assembly drain includes a second drain port.

8. The thrust control assembly of claim 7, wherein the first radial bearing assembly comprises:
   an inner race;
   an outer race; and
   a plurality of ball bearings captured between the inner race and the outer race.

9. The thrust control assembly of claim 8, wherein the lubricant circulation system further comprises a first fluid level within the first radial bearing chamber, wherein the first fluid level is less than about half the height of the lowermost ball bearing within the first radial bearing assembly.

10. The thrust control assembly of claim 7, wherein the second radial bearing assembly comprises:
    an inner race;
    an outer race; and
    a plurality of ball bearings captured between the inner race and the outer race.

11. The thrust control assembly of claim 10, wherein the lubricant circulation system further comprises a second fluid level within the second radial bearing chamber,
    wherein the second fluid level is less than about half the height of the lowermost ball bearing within the second radial bearing assembly.

12. A horizontal pumping system comprising: a motor;
    a pump driven by the motor; and
    a thrust control assembly connected between the motor and the pump, wherein the thrust control assembly comprises:
    a thrust bearing chamber, wherein the thrust bearing chamber IS configured to contain a quantity of fluid lubricant;
    a thrust bearing assembly contained within the thrust bearing chamber; a first radial bearing chamber;
    a first radial bearing assembly contained within the first radial bearing chamber; and
    a first metering assembly, wherein the first metering assembly is configured to control the flow of lubricant from the thrust bearing chamber to the first radial bearing chamber.

13. The horizontal pumping system of claim 12, wherein the first metering assembly comprises an orifice plate.

14. The horizontal pumping system of claim 13, wherein the orifice plate of the first metering assembly has an exterior surface and wherein the radial bearing chamber has an interior surface and wherein a diameter of the exterior surface of the orifice plate is less than a diameter of the interior surface of the radial bearing chamber.

15. The horizontal pumping system of claim 12, further comprising: a second radial bearing chamber;
    a second radial bearing assembly contained within the second radial bearing chamber; and
    a second metering assembly, wherein the second metering assembly is configured to control the flow of lubricant from the thrust bearing chamber to the second radial bearing chamber.

16. The horizontal pumping system of claim 15, wherein the second metering assembly comprises an orifice plate.

17. A lubricant circulation system for use in a thrust control assembly of a horizontal pumping system, the lubricant circulation system comprising:
    a thrust bearing chamber, wherein the thrust bearing chamber is configured to contain a quantity of fluid lubricant;
    a thrust bearing assembly within the thrust bearing chamber;
    a first radial bearing chamber within the thrust control assembly;
    a first radial bearing assembly within the first radial bearing chamber; and
    a first metering assembly positioned between the thrust bearing chamber and the first radial bearing chamber, wherein the first metering assembly is configured to control the flow of fluid lubricant from the thrust bearing chamber to the first radial bearing chamber.

18. The lubricant circulation system of claim 17, further comprising: a second radial bearing chamber within the thrust control assembly;
    a second radial bearing assembly within the second radial bearing chamber; and
    a second metering assembly positioned between the thrust bearing chamber and the second radial bearing chamber, wherein the second metering assembly is configured to control the flow of fluid lubricant from the thrust bearing chamber to the second radial bearing chamber.

19. The lubricant circulation system of claim 18, wherein the first metering assembly comprises an orifice plate and the second metering assembly comprises an orifice plate.

20. The lubricant circulation system of claim 19, wherein the orifice plate of the first metering assembly is not the same size as the orifice plate of the second metering assembly.

* * * * *